United States Patent
Clarke et al.

(10) Patent No.: US 9,817,731 B2
(45) Date of Patent: Nov. 14, 2017

(54) ACQUIRING DIAGNOSTIC DATA SELECTIVELY

(71) Applicant: International Business Machines Corporation, Armonk, NY (US)

(72) Inventors: Michael P. Clarke, Ellenbrook (AU); John A. W. Kaputin, Perth (AU); King-Yan Kwan, Perth (AU); Andrew Wright, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/860,234

(22) Filed: Sep. 21, 2015

(65) Prior Publication Data
US 2016/0246691 A1    Aug. 25, 2016

Related U.S. Application Data

(63) Continuation of application No. 14/627,331, filed on Feb. 20, 2015.

(51) Int. Cl.
*G06F 11/00* (2006.01)
*G06F 11/14* (2006.01)
*G06F 11/07* (2006.01)

(52) U.S. Cl.
CPC ...... *G06F 11/1474* (2013.01); *G06F 11/0706* (2013.01); *G06F 11/079* (2013.01);
(Continued)

(58) Field of Classification Search
CPC .............. G06F 11/0745; G06F 11/079; G06F 11/0793; G06F 11/1402; G06F 11/1405; G06F 11/302
See application file for complete search history.

(56) References Cited

U.S. PATENT DOCUMENTS 7,493,527 B2   2/2009   Garza et al.
7,877,642 B2   1/2011   Ding et al.
(Continued)

FOREIGN PATENT DOCUMENTS

JP         4635993 B2    2/2011

OTHER PUBLICATIONS

Huang et al., "CLAP: Recording Local Executions to Reproduce Concurrency Failures", PLDI'13, Jun. 16-19, 2013, Seattle, WA, USA, © 2013 ACM 978-1-4503-2014—Jun. 13, 2006, pp. 141-151.

(Continued)

*Primary Examiner* — Philip Guyton
(74) *Attorney, Agent, or Firm* — Adolph C. Bohnstedt

(57) ABSTRACT

One or more processors execute one or more software commands that are capable of command failure on one or more computing devices. One or more processors detect one or more failed commands as a result of executing the one or more software commands. One or more processors determine whether the one or more failed commands are a first type of command failures that result from a first type of software commands. One or more processors reissue the one or more failed commands that are determined to be the first type of software commands at least once while at least one diagnostic program is executing. One or more processors capture diagnostic data for the one or more failed commands that are determined to be the first type of software commands.

6 Claims, 3 Drawing Sheets

(52) U.S. Cl.
CPC ...... G06F 11/0721 (2013.01); G06F 11/0751 (2013.01); *G06F 11/1479* (2013.01); *G06F 2201/805* (2013.01); *G06F 2201/85* (2013.01); *G06F 2201/87* (2013.01)

(56) References Cited

U.S. PATENT DOCUMENTS

| | | |
|---|---|---|
| 9,015,006 B2 | 4/2015 | Addison et al. |
| 2006/0070077 A1 | 3/2006 | Erlandson et al. |
| 2008/0034082 A1* | 2/2008 | McKinney .......... G06F 11/3466 709/224 |
| 2008/0126873 A1* | 5/2008 | Cocker ............... G06F 11/3636 714/38.11 |
| 2009/0105982 A1 | 4/2009 | Sarig et al. |
| 2012/0144234 A1 | 6/2012 | Clark et al. |
| 2012/0226945 A1 | 9/2012 | Johnson et al. |
| 2016/0246658 A1* | 8/2016 | Clarke ................ G06F 11/1474 |
| 2016/0246691 A1* | 8/2016 | Clarke ................ G06F 11/1474 |

OTHER PUBLICATIONS

Nguyen et al., "Insight: In-situ Online Service Failure Path Inference in Production Computing Infrastructures", 2014 USENIX Federated Conferences Week Jun. 17-20, 2014, <https://www.usenix.org/system/files/conference/atc14/atc14-paper-nguyen.pdf>.

U.S. Appl. No. 14/627,331, Entitled "Acquiring Diagnostic Data Selectively", filed Feb. 20, 2015, .

Appendix P—"List of IBM Patents or Patent Applications Treated as Related".

* cited by examiner

ACQUIRING DIAGNOSTIC DATA SELECTIVELY

BACKGROUND OF THE INVENTION

The present invention relates generally to the field of computer performance enhancement, and more particularly to efficient implementation of computer diagnostics.

Long-term computer performance is enhanced by the use of computer diagnostic programs. A diagnostic program is a program written for the express purpose of locating problems or areas of performance that can be improved with the software, hardware, or any combination thereof in a system, or a network of systems. Preferably, diagnostic programs provide solutions to the user to solve issues. Like any program, diagnostic programs use processor resources, which leads to a decrease in computer performance. Thus, many end users work with diagnostic programs off or in a heavily suppressed state in order to enhance short-term computer performance.

In many scenarios, if a command failure occurs when a diagnostic program is suppressed, then an end user often must manually recreate the failing situation with the diagnostic program running if diagnostic data is to be obtained. Thus, the suppression of diagnostic programs, which may save time and resources when software functions normally, leads to the wasting of time and resources in the case of a malfunction.

SUMMARY

Embodiments of the present invention provide a method, system, and program product to capture computer diagnostic data. One or more processors execute one or more software commands that are capable of command failure on one or more computing devices. One or more processors detect one or more failed commands as a result of executing the one or more software commands. One or more processors determine whether the one or more failed commands are a first type of command failures that result from a first type of software commands, wherein diagnostic data for the failure of the first type of software commands is to be collected. One or more processors reissue the one or more failed commands that are determined to be the first type of software commands at least once while at least one diagnostic program is executing. One or more processors capture diagnostic data for the one or more failed commands that are determined to be the first type of software commands.

DETAILED DESCRIPTION

Embodiments of the present invention recognize that short-term computer performance is improved when diagnostic programs are suppressed during normal functions. Embodiments of the present invention recognize that long-term computer performance is improved when diagnostic programs are allowed to collect data during occasional computer malfunctions. Embodiments of the present invention provide a method for collecting diagnostic data without constantly running diagnostic programs. Embodiments of the present invention provide a method to selectively run diagnostic programs only when a failed command has occurred.

The present invention will now be described in detail with reference to the Figures.

Figure 1:
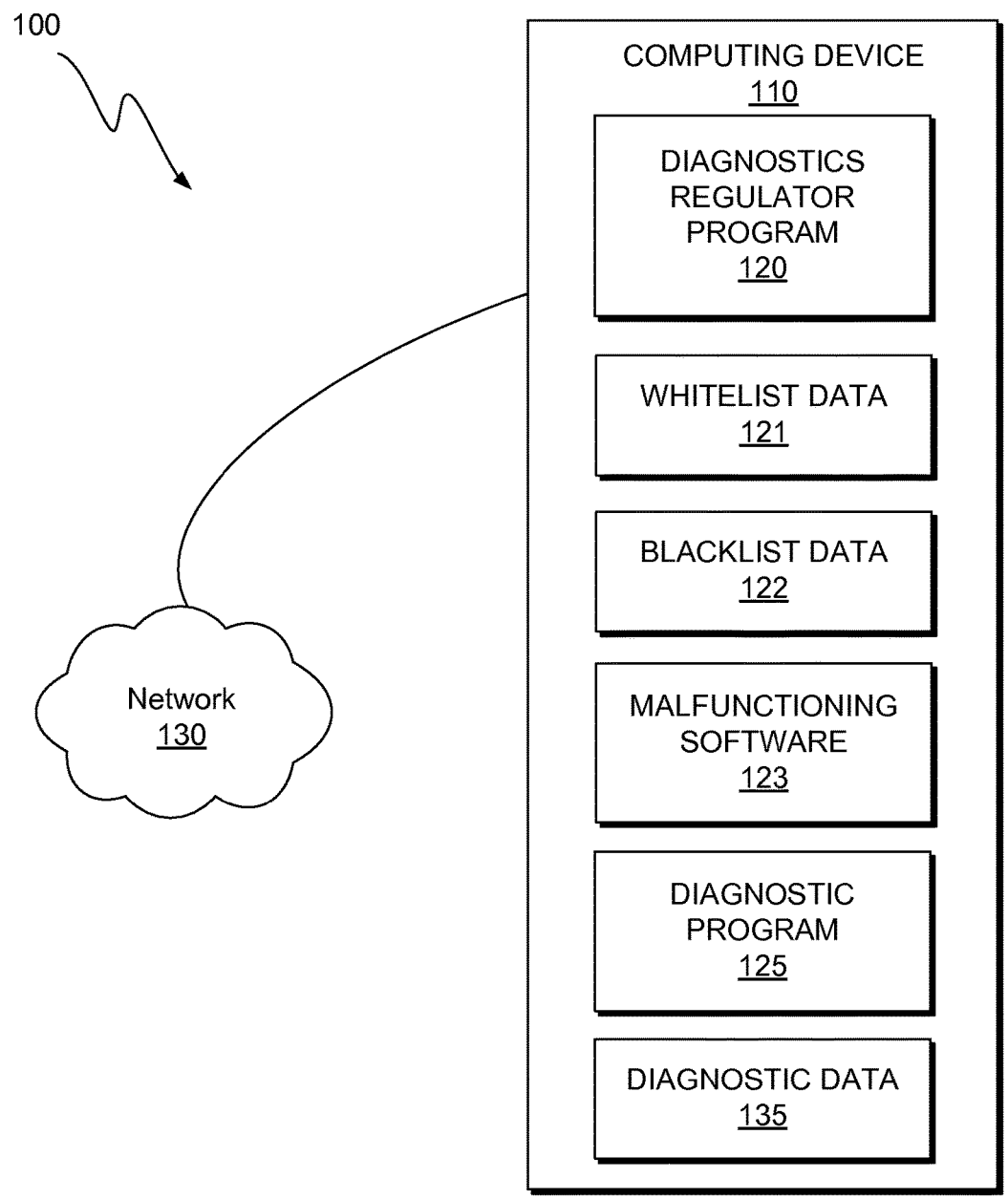
FIG. 1 is a functional block diagram illustrating a diagnostics regulating environment, in accordance with an exemplary embodiment of the present invention.

FIG. 1 is a functional block diagram illustrating a diagnostics regulating environment, generally designated 100, in accordance with one embodiment of the present invention. Diagnostics regulating environment 100 includes computing device 110 connected over network 130. Computing device 110 includes diagnostics regulator program 120, whitelist data 121, blacklist data 122, malfunctioning software 123, diagnostic program 125, and diagnostic data 135.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to whitelist data 121, blacklist data 122, malfunctioning software 123, and diagnostic data 135 and is capable of executing diagnostics regulator program 120, malfunctioning software 123, and diagnostic program 125. Computing device 110 may include internal and external hardware components, as depicted and described in further detail with respect to FIG. 3.

In this exemplary embodiment, diagnostics regulator program 120, whitelist data 121, blacklist data 122, malfunctioning software 123, diagnostic program 125, and diagnostic data 135 are stored on computing device 110. However, in other embodiments, at least one of diagnostics regulator program 120, whitelist data 121, blacklist data 122, malfunctioning software 123, diagnostic program 125, and diagnostic data 135 is stored externally and accessed through a communication network, such as network 130. In some embodiments, network 130 is, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, diagnostics regulator program 120, whitelist data 121, blacklist data 122, malfunctioning software 123, diagnostic program 125, and diagnostic data 135, in accordance with a desired embodiment of the present invention.

As used herein, "command," "computer command," and the like include an invocation of a particular operating system or subsystem service. For example "command" includes a Structured Query Language (SQL) call to a relational database, or a command-level Customer Information Control System (EXEC CICS) command to invoke a CICS application or system programming operation. As used herein, "command failure," "computer command failure," and the like include any problems with computer hardware or software, the origins of which can be traced back to a computer command. As used herein, "transaction"

includes an execution of a program or programs to perform a logical unit of work or multiple logical units of work, typically consisting of application business logic containing or invoking one or more commands.

In exemplary embodiments, diagnostic program 125 is initially suppressed or turned off. Diagnostics regulator program 120 provides an implementation to allow a computer system running malfunctioning software 123 to automatically rerun a failed command from malfunctioning software 123 with diagnostic program 125 turned on in order to capture diagnostic data 135 on the failed command. Diagnostic data 135 is used to reduce future occurrences of that particular command failure from malfunctioning software 123. Thus, a user does not have to manually attempt to recreate the malfunctioning software 123 command failure with diagnostic program 125 engaged.

In one embodiment, diagnostics regulator program 120 includes sub-programming capable of heuristic learning. Heuristic learning facilitates the ability of diagnostics program 120 to automatically determine whether a failed command of malfunctioning software 123 will or will not be reissued with diagnostics program 125 running. For example, failed commands for a general type of transaction within malfunctioning software 123 are usually retried. Diagnostics regulator program 120 logs this information and makes retries of the failed commands of those types of transactions a default decision. On the other hand, when failed commands for a general type of transaction within malfunctioning software 123 are rarely retried, diagnostics regulator program 120 logs this information and makes not retrying those failed commands a default decision.

In various embodiments, diagnostics regulator program 120 logs when diagnostic data 135 has been collected by diagnostic program 125 for a specific command failure within malfunctioning software 123. In some embodiments, diagnostic regulator program 120 will not initiate a second collection of already acquired data. In such embodiments, if diagnostic regulator program 120 detects that a specific command for a specific transaction within malfunctioning software 123 failed and diagnostic data 135 has been gathered during a prior occurrence of that failure, then diagnostics regulator program 120 treats the malfunctioning software 123 command failure as not requiring diagnostic data 135 and allows, for example, an abnormal ending to occur without again running diagnostic program 125. In various embodiments, diagnostics regulator program 120 queries an end user on whether they wish to run diagnostics on a particular malfunctioning software 123 command failure. Diagnostics regulator program 120 subsequently incorporates the end user response into the diagnostics regulator program 120 heuristic learning sub-program. In this embodiment, end user preference data is stored within one or more of diagnostics regulator program 120, whitelist data 121, and blacklist data 122 that enables diagnostics regulator program 120 to predict whether or not the end user would want future failed commands of a certain type within malfunctioning software 123 to be reissued with diagnostic program 125 running.

In exemplary embodiments of the present invention, whitelist data 121 includes data that indicates a certain set of command failures by malfunctioning software 123 should, by default, be retried with diagnostic program 125 running in order to acquire diagnostic data 135 for those failures. For example, a command failure occurs during the running of malfunctioning software 123 involving a particular type of task or condition. If that failure warrants the acquisition of diagnostic data 135 according to whitelist data 121, then diagnostics regulator program 120 reissues the command with diagnostic program 125 running. In this example, whitelist data 121 contains information such as an abend code (abnormal end) that correlates the malfunctioning software 123 command failure with a task or condition that, by default, is to be reissued with diagnostic program 125 running in order to acquire diagnostic data 135. In various embodiments, whitelist data 121 may be overridden if, for example, the end user wishes to modify the whitelist data or if diagnostic data 135 has already been acquired for that specific command failure. Examples of the types of transactions likely to be whitelisted include high visibility, important transactions such as automated teller machine (ATM) transactions.

In exemplary embodiments of the present invention, blacklist data 122 includes data that indicates a certain set of command failures by malfunctioning software 123 should, by default, not be retried with diagnostic program 125 running because diagnostic data 135 is not desired for those failures. For example, a command failure occurs during a particular type of task or condition, which is not important enough to warrant the acquisition of diagnostic data 135. Blacklist data 122 contains information such as an abend code (abnormal end) that correlates the command failure with a task or condition, wherein any command failures in that task or condition should, by default, not be reissued with diagnostic program 125 running. Command failures that correlate with Blacklist 122 data are not reissued because they are, in general, not worth the decrease in performance that would result from running diagnostic program 125 to collect diagnostic data 135 for those command failures. In some embodiments and scenarios, blacklist data 122 is overridden if, for example, the end user wishes to directly modify the blacklist data or if diagnostics regulator program 120 has heuristically determined that some parameters governing the logic behind some blacklisted data should be modified so as to allow diagnostic data 135 for that data (e.g., the commands in question are removed from blacklist data 122). Examples of the types of transactions likely to be whitelisted include commands that are not deemed important enough to warrant the consumption of system resources required for diagnostics such as, for example, test transactions, commands for sending emails, or destructive operations.

In exemplary embodiments, the data on whitelist data 121 is mutually exclusive of the data on blacklist 122.

In exemplary embodiments, malfunctioning software 123 is any computer software that includes commands that are capable of failing. Malfunctioning software 123 is not limited to application software. In various embodiments, malfunctioning software 123 includes any machine-readable instructions that direct a computer processor or processors to perform specific operations. For example, malfunctioning software 123 not only includes any application on computing device 110, it also includes the operating system environment of computing device 110.

In exemplary embodiments, diagnostic program 125 is a program that locates problems with computer hardware, operating system environments, or software programs (such as malfunctioning software 123). In certain embodiments, diagnostic program 125 includes tracing functionality, which is a specialized use of logging to record information about the execution of a program such as malfunctioning software 123. The tracing functionality contains code to enable diagnostic program 125 to perform tasks such as the monitoring of the resources and performance of a computer system and to capture statistics of such monitoring. In many embodiments, diagnostic program 125 includes the ability to generate a core dump (also known as a memory or system dump). In general, a core dump consists of the recorded state of the working memory of a computer program such as malfunctioning software 123 at a specific time, generally when the program has terminated abnormally. In many embodiments, diagnostic program 125 includes the ability to generate diagnostic messages, which are statements produced automatically during computer processing activities, such as program compilation, that provide information on the status of the computer or its software, particularly errors or potential problems. In various embodiments, diagnostic program 125 is run manually or automatically depending on a user's preference. In exemplary embodiments, diagnostic program 125 is run by diagnostics regulator program 120 automatically. In other embodiments, diagnostics regulator program 120 provides an opportunity for the user to interactively modulate the parameters that govern the execution of diagnostic program 125.

In exemplary embodiments, diagnostic data 135 includes any data acquired from malfunctioning software 123 by diagnostic program 125. In various embodiments diagnostic data 135 includes, but is not limited to one or more of the following: i) Data about program execution recorded by diagnostic program 125 using tracing functionality; ii) core dump data from diagnostic program 125; and iii) diagnostic messages from diagnostic program 125. In various embodiments, diagnostic data 135 is used by diagnostics regulator program 120 in order to regulate the future use of diagnostic program 125. For example, diagnostics regulator program 120 monitors what failed commands of malfunctioning software 123 already have diagnostic data 135 and will prevent the redundant acquisition of the previously obtained data.

Figure 2:
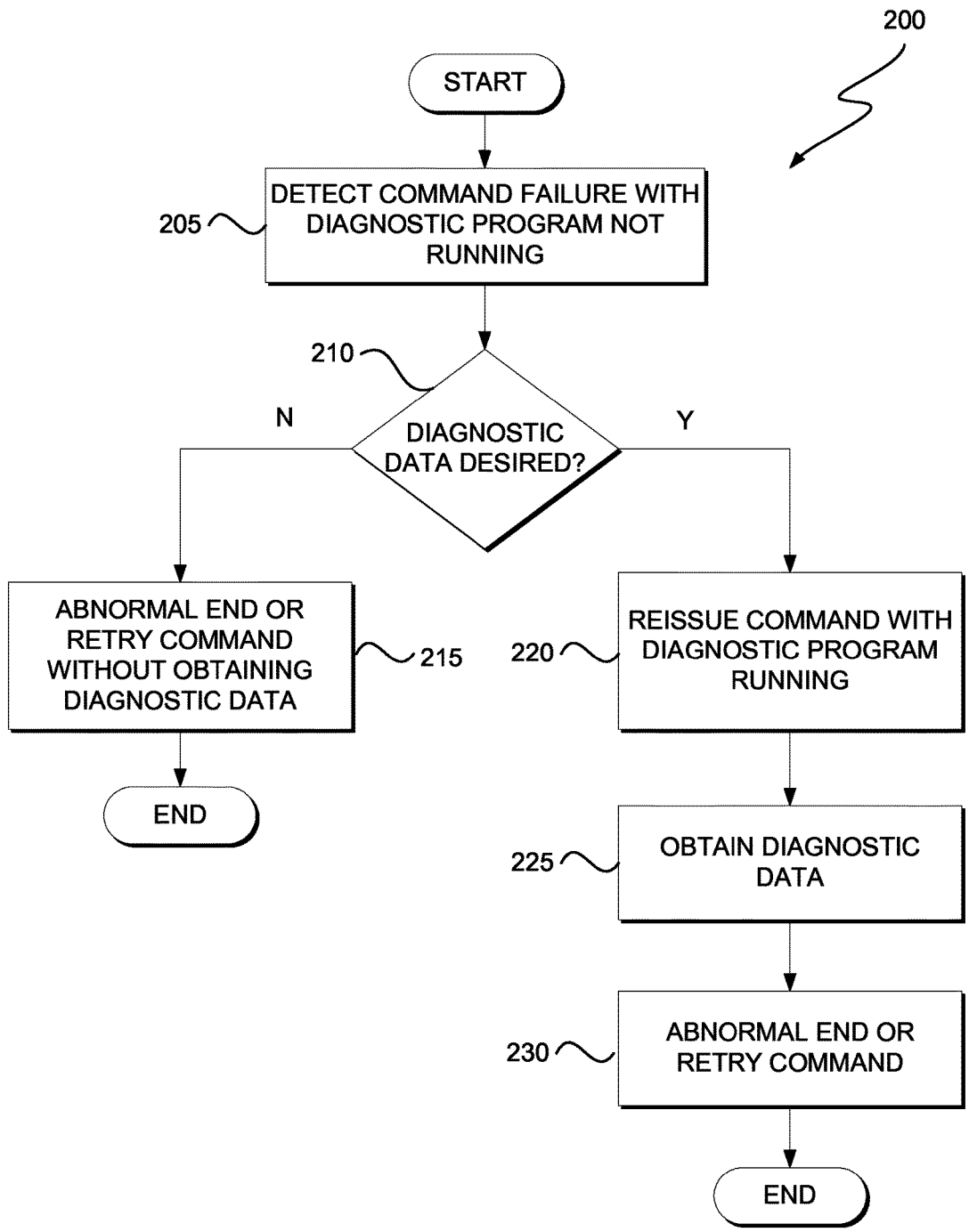
FIG. 2 illustrates operational processes of diagnostics regulator program 120, executing on a computing device within the environment of FIG. 1, in accordance with an exemplary embodiment of the present invention.

FIG. 2 illustrates operational processes, generally designated 200, of diagnostics regulator program 120, on computing device 110 within the environment of FIG. 1, in accordance with an exemplary embodiment of the present invention.

In step 205, malfunctioning software 123 executes commands with diagnostic program 125 suppressed or not running. Upon failure of a command within malfunctioning software 123, logic is invoked by diagnostics regulator program 120 such that diagnostics regulator program 120 identifies the nature of the command failure (e.g. a task, condition, abend code, or a combination thereof).

In step 210, diagnostics regulator program 120 determines whether diagnostic data 135 is desired. In other words, diagnostics regulator program 120 determines whether the malfunctioning software 123 failed command should be reissued with diagnostic program 125 running. In some embodiments, diagnostics regulator program 120 bases the determination of whether diagnostic data 135 is desired on hardcoded algorithmic settings included in one or more of whitelist data 121, blacklist data 122, and diagnostics regulator program 120. In other embodiments, such a decision is based on heuristically learned autonomic settings derived from archived historical data that is stored in one or more of: whitelist data 121, blacklist data 122, and diagnostics regulator program 120. In various embodiments, the decision by diagnostics regulator program on whether or not to have malfunctioning software 123 reissue the failed command with diagnostic program 125 running takes into account one or more factors. In one embodiment, these factors include, but are not limited to one or more of the following: i) whether whitelist data 121 indicates that the failed command should be reissued with diagnostic program 125 running; ii) whether blacklist data 122 indicates that the failed command should not be reissued with diagnostic program 125 running; iii) whether an end user has indicated manually or after being queried that the failed command should or should not be reissued with diagnostic program 125 running; iv) whether diagnostic data 135 has previously been acquired because of a prior failure of the same malfunctioning software 123 command (hence re-acquiring the same data is redundant); and v) whether diagnostics regulator program 120 has heuristically determined (learned) that the failed command should or should not be reissued based on archived historical data stored in diagnostics regulator program 120, whitelist data 121, and blacklist data 122.

In certain cases, the malfunctioning software 123 failed command is a time-dependent issue involving a transient problem. For example, the failed command is a result of a temporary problem with a connected server or database. Thus, in exemplary embodiments of the present invention diagnostics regulator program 120 reissues failed commands initially without diagnostic program 125 executing in order to detect whether the failure repeats. In one embodiment, if the failure does not repeat, then diagnostics regulator program 120 treats the problem as transient and continues on to the next command. In some embodiments, diagnostics regulator program 120 will initially reissue a failing command more than once without running diagnostic program 125 depending on a provided set of parameters. In general, the more times an initially failed command succeeds or fails in subsequent retries, the more confident diagnostics regulator program 120 is that the failure is a system problem (consistent subsequent failure) or a transient problem (consistent subsequent non-failure). In some embodiments, diagnostics regulator program 120 executes diagnostic program 125 with all initial reissuances of failed commands. In the event a failed command refuses to fail again consistently (indicating a likely transient problem), diagnostic data 135 relating to that failure is deleted, depending on set parameters.

Step 215 occurs if diagnostics regulator program 120 determines that the malfunctioning software 123 failed command does not require diagnostic data. In this case diagnostic program 125 is not engaged and the command terminates without diagnostics. The normal outcome is observed for malfunctioning software 123 such as an abnormal termination of the program (abend or abnormal end), a rollback (a return of a database to a previous state), or the malfunctioning software 123 simply carries on, if possible, despite the command failure. Malfunctioning software 123 then continues to the execution of the next command.

In Step 220, if diagnostics regulator program 120 determines that a failed malfunctioning software 123 command requires diagnostic data, then diagnostics regulator program 120 reissues the command with diagnostic program 125 engaged in order to obtain diagnostic data 135. In exemplary embodiments, actions that would be triggered for diagnostic program 125 in step 220 include the switching off of core dump and diagnostic message suppression and the switching on of monitoring and statistics data capture (i.e. tracing functionality). In general, diagnostic program 125 is initiated in step 220 to locate problems with the software, hardware, or any combination thereof in a system or network of systems in question with respect to the failed command. In exemplary embodiments, diagnostic program 125 provides solutions to the user to solve the issues associated with the failed command.

In exemplary embodiments, step 225 occurs after a failed malfunctioning software 123 command has been retried to obtain diagnostic data. The diagnostic data retrieved by diagnostic program 125 is stored as a portion of diagnostic data 135. In alternate embodiments, the retrieved diagnostic data constitutes all of diagnostic data 135. Either way, this diagnostic data is available for analysis. In various embodiments, diagnostic data 135 includes, but is not limited to one or more of: i) data about the malfunctioning software 123 execution recorded by diagnostic program 125 using tracing functionality; ii) malfunctioning software 123 core dump data obtained from diagnostic program 125; and iii) diagnostic messages from diagnostic program 125 regarding the command failure of malfunctioning software 123.

Step 230 occurs after diagnostic data 135 has been collected by diagnostics regulator program 120 from malfunctioning software 123. In this case, the normal outcome is observed such as an abnormal termination of software 123 (abend or abnormal end), a rollback (a return of a database to a previous state), or allowing malfunctioning software to continue execution (if possible) despite the command failure. Diagnostics regulator program 120 then terminates the execution of diagnostic program 125 and the system continues to the execution of the next command.

Figure 3:
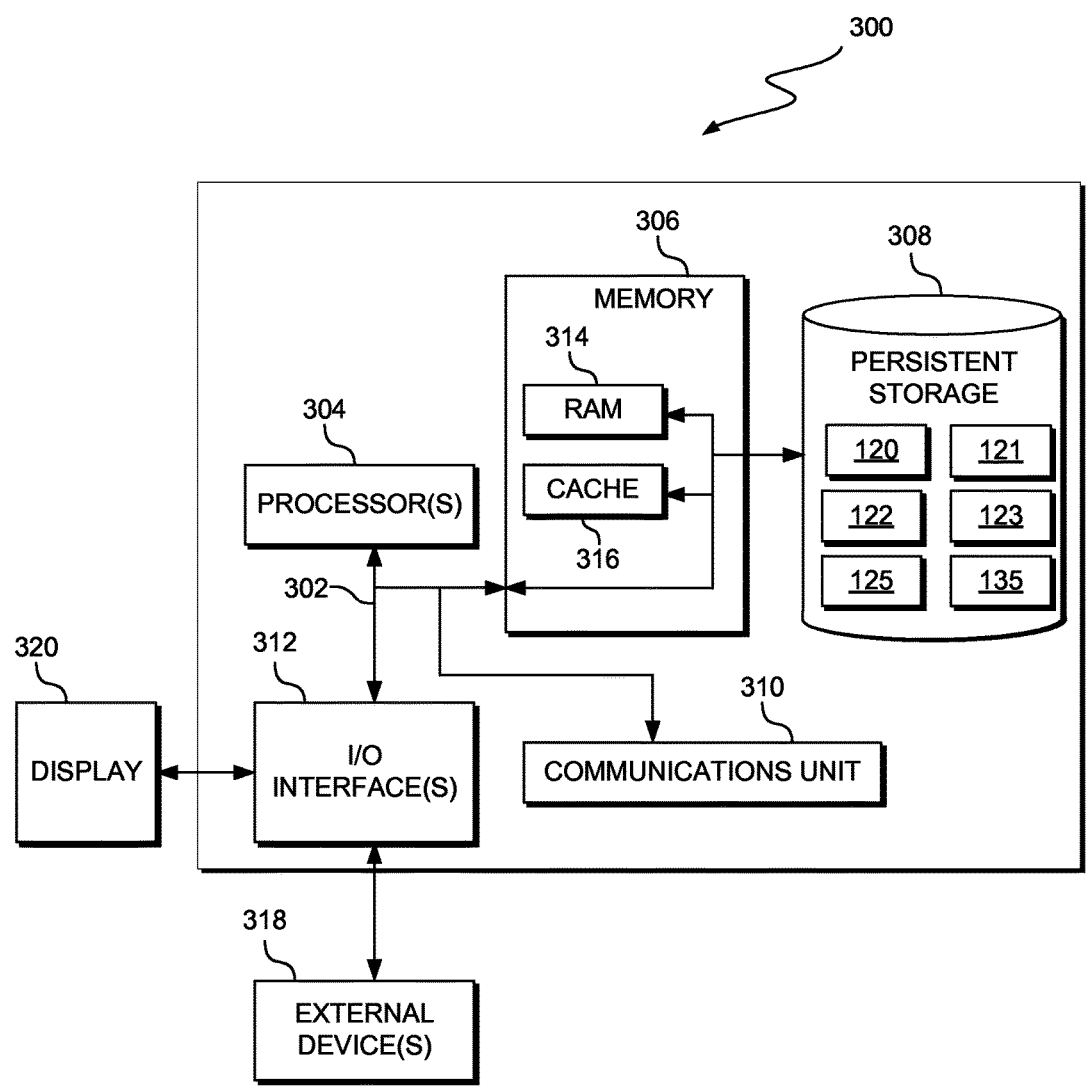
FIG. 3 depicts a block diagram of components of the computing device executing diagnostics regulator program 120, malfunctioning software 123, and diagnostic program 125, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Diagnostics regulator program 120, whitelist data 121, blacklist data 122, malfunctioning software 123, diagnostic program 125, and diagnostic data 135 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Diagnostics regulator program 120, whitelist data 121, blacklist data 122, malfunctioning software 123, diagnostic program 125, and diagnostic data 135 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g. diagnostics regulator program 120, whitelist data 121, blacklist data 122, malfunctioning software 123, diagnostic program 125, and diagnostic data 135, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk," "CICS," and the like may be subject to trademark rights in various jurisdictions throughout the world and are used here only in reference to the products or services properly denominated by the marks to the extent that such trademark rights may exist.

What is claimed is:

1. A method of capturing computer diagnostic data comprising:
    executing, by one or more processors, one or more software commands that are capable of command failure on one or more computing devices;
    detecting, by one or more processors, one or more failed commands as a result of executing the one or more software commands;
    heuristically determining, by one or more processors, whether the one or more failed commands are:
        i) a first type of command failures that result from a first type of software commands, wherein diagnostic data is to be collected by default based at least on a first assigned importance of the first type of software commands; or
        ii) a second type of command failures that result from a second type of software commands, wherein diagnostic data is not to be collected by default based at least on a second assigned importance of the second type of software commands;
    reissuing, by one or more processors, the one or more failed commands that are determined to be the first type of software commands at least once while at least one diagnostic program is executing; and
    capturing, by one or more processors, diagnostic data for the one or more failed commands that are determined to be the first type of software commands.

2. The method of claim 1, wherein the step of executing, by one or more processors, one or more software commands that are capable of command failure on one or more computing devices further comprises:
  executing, by one or more processors, one or more software commands that are capable of command failure on one or more computing devices, wherein the at least one diagnostic program is suppressed.

3. The method of claim 1 further comprising:
  reissuing, by one or more processors, the one or more failed commands that are determined to be the first type of software commands at least once while the at least one diagnostic program is suppressed.

4. The method of claim 1 further comprising:
  creating, by one or more processors, a first data set, wherein the first data set facilitates a determination, at least in part, of whether the one or more failed commands are the first type of software commands.

5. The method of claim 1 further comprising:
  creating, by one or more processors, a second data set, wherein the second data set facilitates a determination, at least in part, of whether the one or more failed commands are the second type of software commands.

6. The method of claim 1 further comprising:
  allowing, by one or more processors, one or more software applications that attempt to execute the one or more failed commands that are the first type of software commands to one or more of: end abnormally, rollback to a pre-failure state, or continue running after diagnostic data has been captured.

* * * * *